June 1, 1965  H. BELLER  3,187,331
MICRO-WAVE ABSORBER
Filed April 21, 1949

INVENTOR
Hans Beller
BY
ATTORNEY

United States Patent Office 3,187,331
Patented June 1, 1965

3,187,331
MICRO-WAVE ABSORBER
Hans Beller, Cranford, N.J., assignor to General Aniline & Film Corporation, New York, N.Y., a corporation of Delaware
Filed Apr. 21, 1949, Ser. No. 88,858
3 Claims. (Cl. 343—18)

This invention relates to detection systems employing ultra-high-frequency electromagnetic radiation, and more particularly to a device and method for preventing reflection of such radiation from an object whereby its location and range cannot be determined.

A primary object of this invention is to alter the ultra-high-frequency reflection characteristics of a body surface.

Another object of the invention is to absorb ultra-high-frequency electromagnetic waves impinging upon a body which normally would reflect the waves.

A feature of this invention is that a protective layer of material, having low dielectric constant and low permeability, is applied to the surface of an object which absorbs a substantial portion of the impinging wave energy.

A particular advantage of the invention is that the wave absorbing medium may easily be incorporated in various plastic materials to form a covering sheet, or it may be applied to flexible fabrics which may form a protective cover easily placed on, or removed from the object.

The absorbing material herein described is equally well-suited for application to all types of surfaces in the form of a paint, whereby protective coating against detection by reflected waves may be quickly and easily obtained.

Other objects, features, and advantages will be apparent from the following description of the invention, pointed out in particularity in the appended claims, and taken in connection with the accompanying drawing, in which:

Figure 1:
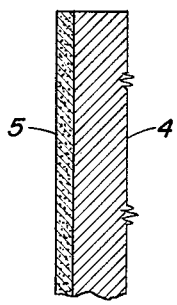
FIGURE 1 is a schematic representation in cross section of a portion of a body bearing a layer of protective material.

Protection against "radar" detection by enlarging the scattering factor of the reflecting surface has been advocated, in which case the surface is covered with strategically located reflectors having certain angular geometric configurations which change the reflecting angle. In a similar manner, it was proposed to use a layer of semi-conducting material which will effect a distortion of the reflected radiation.

While these measures have contributed to some extent to the quest of foiling radar detection, the fact that by these means active radiation is not prevented, but rather distorted, places narrow limits to their efficacy. No matter how many reflecting facets are provided which alter the effective angle of incidence, as far as the plane surface of the object is concerned, there will always remain in the dispersed reflected beam components having the proper phase angle for reception.

The present invention attacks and solves the problem from a different approach. Instead of producing false reflections, it will effectively prevent reflection of detectable magnitudes. To this end, means are provided for absorbing a large portion of the radiation immediately in a protective layer covering a body subjected to ultra-high-frequency electromagnetic wave energy.

It is a well-established fact that ultra-high-frequency radiation, generally termed micro-waves, in the region of 500 megacycles or higher will not penetrate deeply and is reflected by materials having high conductivity and permeability or a high dielectric constant. On the other hand, materials having low conductivity and a low dielectric constant, when subjected to such radiation, will absorb portions of the wave energy, the extent of absorption depending, among other factors, upon the particular electrical characteristics of the material.

Materials of high absorption characteristics are not readily obtainable in suitable form to be applied to various types of surfaces in order to alter their conductivity. Theoretically speaking, elemental particles of conducting material, properly distributed, where the physical shape of each particle bears a responsive relationship to the wavelength of the radiation admissive to absorption of energy, would provide an ideal absorbing medium. Based on this theoretical consideration, it is proposed, in accordance with this invention, to employ finely divided particles of conducting material, such as carbonyl iron powder imbedded in an insulating plastic matrix as a covering or coating over the surface of the object to be protected from detection. It was found that this material has a sufficiently low permeability and low dielectric constant to admit a large portion of micro-wave radiation.

The matrix for the carbonyl iron powder may be any number of materials, paints, flexible sheets or solids, for example, polystyrene, rubber or various artificial resin materials. Carbonyl iron powder particles are of a spherical shape and microscopic size averaging about 5 microns.

The composition of carbonyl iron powder and insulating binder may be applied in various forms to cover the surface of an object which is desired to be protected from detection by radar. The principle of the invention is illustrated by way of example in FIGURE 1 showing in cross section a metallic object 4 which has normally a reflecting surface of high conductivity and high permeability for ultra-high-frequency radiation, being protected with a layer of plastic material 5 composed of carbonyl iron powder imbedded in a suitable insulating matrix. The plastic sheet material may be glued or affixed in any desired manner to the surface of the object.

Figure 2:
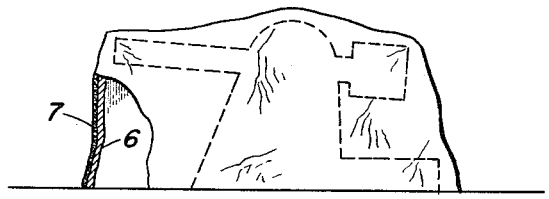
FIGURE 2 is an illustration of the application of the invention to a flexible cover showing in partial cross section the protective layer on the flexible material.

In certain applications it is advantageous to have a flexible covering, such as fabric or rubber, which may easily be placed over the object and removed therefrom, for example, an ordnance piece. The covering of flexible material, when a fabric, may be impregnated with a solution containing carbonyl iron powder or coated with such a solution. This is shown in FIGURE 2. The partial cross section illustrates that the flexible covering material 6 has a coating 7 of protective composition.

Figure 3:
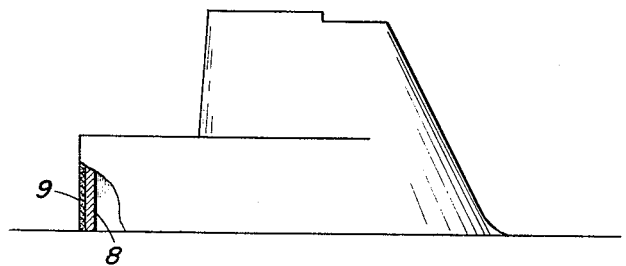
FIGURE 3 illustrates the application of the invention to a solid surface in the form of a paint or coating, showing also, in partial cross section, the solid and the protective coating thereon.

The layer may also be directly applied to solid pieces in the form of paint, as seen in FIGURE 3 which exemplifies a metallic stucture 8 coated with a protective layer 9 of carbonyl iron powder suspended in the paint.

For the sake of easier understanding, the relative thickness of the layer or coating is exaggerated in the various views which are to be taken as an example depicting the basic principle of the invention. The thickness of the coating layer may be varied depending upon the particular application from a normal coat of paint to sheet material of sizeable thickness. The ratio of iron powder and binder may also be in various proportions, the consistencies being governed by the adaptability of the binder to hold the powder material. It is advantageous to have a mixture of such consistency which permits the maximum number of iron powder particles per unit area without cohesion between them.

All types of layers employing carbonyl iron powder dispersed in an insulating medium exhibit a low dielectric constant and low permeability and will absorb a substantial portion of incident micro-wave radiation. The absorption is considered to be due to the excitation of the elementary particles creating an energy transfer. There being an extremely large number of elementary particles per unit area, inasmuch as each particle is of microscopic size, a very effective absorbing surface is created. Each particle is also of substantially equal size and shape, whereby the energy transfer is equally distributed over the area with no appreciable scattering effect. Scattering of the radiation as an anti-radar measure is, in certain cases, of no advantage, for the scattered radiation often produces detection of the object at other receiving points than at the point of origin of the transmitted wave. Therefore, absorption in the simple manner as pointed out above assures for greater protection.

I claim:

1. In combination with a body having normally a reflecting surface of high conductivity and high permeability which, when subjected to high-frequency electromagnetic waves, causes reflections of easily detectable amplitudes, means for altering said conductivity and thereby substantially preventing reflections of detectable magnitudes comprising a protective layer of finely divided particles of carbonyl iron powder having an average particle size of about 5 microns, said layer dispersed in an insulating medium having low dielectric constant, low permeability, and exhibiting no cohesion between individual particles.

2. In combination with a body having normally a reflecting surface of high conductivity which, when subjected to high-frequency electromagnetic waves, causes reflections of easily detectable amplitudes, means for altering said conductivity and thereby substantially preventing reflections of detectable magnitudes comprising a protective layer of carbonyl iron powder having an average particle size of about 5 microns imbedded in an insulating binder, said powder exhibiting no cohesion between individual particles.

3. In combination with a body having normally a reflecting surface of high conductivity which, when subjected to high-frequency electromagnetic waves, causes reflections of easily detectable amplitudes, means for altering said conductivity and thereby substantially preventing reflections of detectable magnitudes comprising a cover of flexible substance adapted to envelop said body, said cover having an outer layer of carbonyl iron powder having an average particle size of about 5 microns imbedded in an insulating binder, said powder exhibiting no cohesion between individual particles.

References Cited by the Examiner

UNITED STATES PATENTS

| | | |
|---|---|---|
| 2,418,479 | 4/47 | Pratt et al. |
| 2,436,578 | 2/48 | Korn et al. _____ 343—18 |
| 2,464,006 | 3/49 | Tiley _____ 343—18 |
| 2,544,391 | 3/51 | Marling _____ 106—304 |
| 2,594,971 | 4/52 | Moullin _____ 343—18 |
| 2,599,944 | 6/52 | Salisbury _____ 343—18 |

FOREIGN PATENTS

| | | |
|---|---|---|
| 22,711 | 5/35 | Australia. |
| 802,728 | 9/36 | France. |

OTHER REFERENCES

Article, "Attenuator Materials for Microwaves," by Teal, Rigterink and Frosh, published in the periodical, Electrical Engineering, August 1948, pp. 754–757.

KATHLEEN H. CLAFFY, *Primary Examiner.*

NORMAN H. EVANS, JAMES L. BREWRINK,
*Examiners.*